US011959743B1

(12) United States Patent
Gao et al.

(10) Patent No.: US 11,959,743 B1
(45) Date of Patent: Apr. 16, 2024

(54) DIMENSIONLESS KINEMATICS CALIBRATION METHOD BASED ON VIRTUAL POINT AND RELATED APPARATUS THEREOF

(71) Applicant: GUANGDONG UNIVERSITY OF TECHNOLOGY, Guangzhou (CN)

(72) Inventors: Jian Gao, Guangzhou (CN); Disai Chen, Guangzhou (CN); Yuheng Luo, Guangzhou (CN); Lanyu Zhang, Guangzhou (CN); Zhuojun Zheng, Guangzhou (CN); Guoqing Wu, Guangzhou (CN); Xin Chen, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/482,870

(22) Filed: Oct. 7, 2023

(30) Foreign Application Priority Data

Mar. 20, 2023 (CN) .......................... 202310265200.9

(51) Int. Cl.
*A61B 6/00* (2006.01)
*G01B 9/02* (2022.01)
(Continued)

(52) U.S. Cl.
CPC ......... *G01B 9/02083* (2013.01); *G01C 15/00* (2013.01); *G05B 13/042* (2013.01)

(58) Field of Classification Search
CPC .... G01C 15/00; G01B 9/02083; A61B 6/584; A61B 6/547; A61B 6/487
See application file for complete search history.

(56) References Cited

U.S. PATENT DOCUMENTS 6,873,407 B2 * 3/2005 Vogel ..................... G01C 15/00
356/138
7,079,234 B2 * 7/2006 Vogel ................... G01C 15/002
356/141.1
(Continued)

FOREIGN PATENT DOCUMENTS

CN 112949098 A 6/2021
CN 113359461 A 9/2021
(Continued)

OTHER PUBLICATIONS

Kang Xinyong, Zhao Yixiang, Chen Xin, "Simulation Research of—DOF Robot Arm Based on SimMechanics", Machine Tool & Hydraulics, vol. 44, No. 23, Dec. 31, 2016, pp. 23-29.

*Primary Examiner* — Lam S Nguyen (57) ABSTRACT

A dimensionless kinematics calibration method based on a virtual point and a related apparatus thereof. The method comprises: establishing a kinematics model of a motion mechanism, and arranging a plurality of virtual points at a tail end of the motion mechanism to establish a dimensionless kinematics model and a dimensionless error model; converting a measurement coordinate system into a motion mechanism coordinate system, acquiring a rotation matrix and a translation matrix of a target virtual point measured by the measurement device, and calculating actual coordinates of all virtual points to obtain a measured value of the dimensionless kinematics model; calculating a theoretical value of the dimensionless kinematics model according to a spatial relationship between a reflecting head and the tail end of the motion mechanism; and optimizing the dimensionless error model according to the measured value and the theoretical value to obtain a calibration result.

5 Claims, 4 Drawing Sheets

(51) Int. Cl.
  *G01C 15/00* (2006.01)
  *G05B 13/04* (2006.01)

(56) References Cited

U.S. PATENT DOCUMENTS

| | | | | |
|---|---|---|---|---|
| 7,623,224 B2 * | 11/2009 | Vogel | .................. | G01C 15/00 |
| | | | | 356/141.5 |
| 8,467,071 B2 * | 6/2013 | Steffey | ................ | G01C 15/002 |
| | | | | 356/614 |
| 2012/0163656 A1 | 6/2012 | Wang et al. | | |
| 2016/0278732 A1 * | 9/2016 | Amiri | .................. | A61B 6/547 |
| 2020/0249017 A1 * | 8/2020 | Török | .................. | H04N 7/188 |
| 2021/0088322 A1 | 3/2021 | Zha et al. | | |

FOREIGN PATENT DOCUMENTS

| | | |
|---|---|---|
| CN | 113580148 A | 11/2021 |
| CN | 115619877 A | 1/2023 |
| JP | 2009097985 A | 5/2009 |

* cited by examiner

DIMENSIONLESS KINEMATICS CALIBRATION METHOD BASED ON VIRTUAL POINT AND RELATED APPARATUS THEREOF

CROSS REFERENCE TO RELATED APPLICATIONS

This application claims foreign priority of Chinese Patent Application No. 202310265200.9, filed on Mar. 20, 2023 in the China National Intellectual Property Administration, the disclosures of all of which are hereby incorporated by reference.

TECHNICAL FIELD

The present application relates to the field of kinematics calibration technologies, and particularly to a dimensionless kinematics calibration method based on a virtual point and a related apparatus thereof.

BACKGROUND OF THE PRESENT INVENTION

With the development of microelectronics, military industry, aerospace and other technologies, the requirements for machining accuracy and complexity of parts are increasingly high, and multi-degree-of-freedom mechanisms represented by high-precision five-axis machine tools and high-precision robots are favored. However, due to manufacturing and assembly errors, there is a big error between an actual structure and a theoretical structure of a motion mechanism, which reduces the positioning accuracy.

Kinematics calibration is a method capable of effectively improving the positioning accuracy, but the kinematics calibration greatly depends on accurate calibration models and measured values. When existing methods are used for the kinematics calibration of the motion mechanism, modeling objects are usually three positions and three poses, and because the positions and the poses are numerical values of different dimensions, there may be the problem of uneven distribution when the modeling objects are optimized together. For a dimensionless model proposed to solve this problem, position information of four points needs to be measured at a tail end, and on the premise of large-scale and high-accuracy measurement, a laser tracker is often used for measurement. However, according to existing measurement methods, when four reflecting heads are used to obtain the positions of the four points, an interrupted light continuity error of the laser tracker may be introduced; and when one reflecting head is used to obtain the positions of the four points, a repeated positioning error of a mechanism or a secondary clamping error of a fixture may be introduced, so that an experimental flow is more complicated. In addition, these methods may all have the problem of introducing too many clamping errors.

SUMMARY OF PRESENT INVENTION

The present application provides a dimensionless kinematics calibration method based on a virtual point and a related apparatus thereof for improving the technical problems of introducing too many clamping errors and interrupted light continuity errors and having a tedious calibration process of the prior art in kinematics calibration.

In view of this, a first aspect of the present application provides a dimensionless kinematics calibration method based on a virtual point, which comprises the following steps of:

establishing a kinematics model of a motion mechanism, wherein a tail end of the motion mechanism is clamped with a reflecting head;

arranging a plurality of virtual points at the tail end of the motion mechanism, and establishing a dimensionless kinematics model and a dimensionless error model based on the virtual points and the kinematics model;

converting a measurement coordinate system of a measurement device into a motion mechanism coordinate system according to a spatial relationship between the measurement device and the tail end of the motion mechanism to obtain a new measurement coordinate system;

acquiring a rotation matrix and a translation matrix of a target virtual point measured by the measurement device in the new measurement coordinate system, and calculating actual coordinates of all virtual points according to the rotation matrix and the translation matrix of the target virtual point to obtain a measured value of the dimensionless kinematics model, wherein the target virtual point is an origin of a reflecting head coordinate system;

acquiring a spatial relationship between the reflecting head and the tail end of the motion mechanism, and calculating a theoretical value of the dimensionless kinematics model according to the spatial relationship between the reflecting head and the tail end of the motion mechanism; and performing model optimization on the dimensionless error model according to the measured value and the theoretical value of the dimensionless kinematics model to obtain a dimensionless kinematics calibration result of the motion mechanism.

Optionally, the dimensionless kinematics model is:

$$P = [\, p_1 \;\; p_2 \;\; p_3 \;\; p_4 \,]^T;$$

$$\begin{cases} p_1 = [\, p_{1x} \;\; p_{1y} \;\; p_{1z} \,]^T = T_{OT} + R_{OT}[\, 0 \;\; 0 \;\; 0 \,]^T \\ p_2 = [\, p_{2x} \;\; p_{2y} \;\; p_{2z} \,]^T = T_{OT} + R_{OT}[\, a \;\; 0 \;\; 0 \,]^T \\ p_3 = [\, p_{3x} \;\; p_{3y} \;\; p_{3z} \,]^T = T_{OT} + R_{OT}[\, 0 \;\; b \;\; 0 \,]^T \\ p_4 = [\, p_{4x} \;\; p_{4y} \;\; p_{4z} \,]^T = T_{OT} + R_{OT}[\, a \;\; b \;\; 0 \,]^T \end{cases};$$

wherein, P represents the dimensionless kinematics model, and $P_1$, $P_2$, $P_3$, and $P_4$ are a first virtual point, a second virtual point, a third virtual point and a fourth virtual point respectively; $[P_{1x}P_{1y}P_{1z}]$ represent coordinates of the first virtual point, $[P_{2x}P_{2y}P_{2z}]$ represent coordinates of the second virtual point, $[P_{3x}P_{3y}P_{3z}]$ represent coordinates of the third virtual point, and $[P_{4x}P_{4y}P_{4z}]$ represent coordinates of the fourth virtual point; and $T_{OT}$ is a translation matrix of a measured point, $R_{OT}$ is a rotation matrix of the measured point, a is a distance between the point $P_1$ and the point $P_2$ on the X-axis of the reflecting head coordinate system, and b is a distance between the point $P_1$ and the point $P_3$ on the Y-axis of the reflecting head coordinate system.

Optionally, the converting the measurement coordinate system of the measurement device into the motion mechanism coordinate system according to the spatial relationship between the measurement device and the tail end of the motion mechanism to obtain the new measurement coordinate system, comprises the following steps of:

tracking and measuring the motion mechanism by the measurement device to obtain a reflecting head track rotating in a B-axis and a reflecting head track rotating in a C-axis;

acquiring a center of circle of the B-axis and a center of circle of the C-axis respectively according to the reflecting head track rotating in the B-axis and the reflecting head track rotating in the C-axis, and performing circle fitting based on the reflecting head track rotating in the B-axis and the center of circle of the B-axis to obtain a radius of the B-axis;

moving the center of circle of the C-axis downward by a numerical value corresponding to the radius of the B-axis to obtain an origin of the motion mechanism;

acquiring a plurality of points on an X-axis and a Y-axis by point measurement, and obtaining straight lines on which the X-axis and the Y-axis are located by straight line fitting; and     establishing a coordinate system based on the origin of the motion mechanism and the straight lines on which the X-axis and the Y-axis are located to obtain the new measurement coordinate system.

Optionally, the acquiring the spatial relationship between the reflecting head and the tail end of the motion mechanism, comprises the following steps of:

resetting the motion mechanism, and measuring current rotation matrix and translation matrix of a first virtual point by the measurement device, wherein the first virtual point is an origin of the reflecting head coordinate system; and     acquiring the spatial relationship between the reflecting head and the tail end of the motion mechanism according to the current rotation matrix and translation matrix of the first virtual point.

A second aspect of the present application provides a dimensionless kinematics calibration apparatus based on a virtual point, which comprises:

a first establishment unit for establishing a kinematics model of a motion mechanism, wherein a tail end of the motion mechanism is clamped with a reflecting head;

a second establishment unit for arranging a plurality of virtual points at the tail end of the motion mechanism, and establishing a dimensionless kinematics model and a dimensionless error model based on the virtual points and the kinematics model;

a conversion unit for converting a measurement coordinate system of a measurement device into a motion mechanism coordinate system according to a spatial relationship between the measurement device and the tail end of the motion mechanism to obtain a new measurement coordinate system;

a measurement unit for acquiring a rotation matrix and a translation matrix of a target virtual point measured by the measurement device in the new measurement coordinate system, and calculating actual coordinates of all virtual points according to the rotation matrix and the translation matrix of the target virtual point to obtain a measured value of the dimensionless kinematics model, wherein the target virtual point is an origin of a reflecting head coordinate system;

a calculation unit for acquiring a spatial relationship between the reflecting head and the tail end of the motion mechanism, and calculating a theoretical value of the dimensionless kinematics model according to the spatial relationship between the reflecting head and the tail end of the motion mechanism; and     an optimization unit for performing model optimization on the dimensionless error model according to the measured value and the theoretical value of the dimensionless kinematics model to obtain a dimensionless kinematics calibration result of the motion mechanism.

Optionally, the dimensionless kinematics model is:

$$P = [\, p_1 \ \ p_2 \ \ p_3 \ \ p_4 \,]^T;$$

$$\begin{cases} p_1 = [\, p_{1x} \ \ p_{1y} \ \ p_{1z} \,]^T = T_{OT} + R_{OT}[\, 0 \ \ 0 \ \ 0 \,]^T \\ p_2 = [\, p_{2x} \ \ p_{2y} \ \ p_{2z} \,]^T = T_{OT} + R_{OT}[\, a \ \ 0 \ \ 0 \,]^T \\ p_3 = [\, p_{3x} \ \ p_{3y} \ \ p_{3z} \,]^T = T_{OT} + R_{OT}[\, 0 \ \ b \ \ 0 \,]^T \\ p_4 = [\, p_{4x} \ \ p_{4y} \ \ p_{4z} \,]^T = T_{OT} + R_{OT}[\, a \ \ b \ \ 0 \,]^T \end{cases};$$

wherein, P represents the dimensionless kinematics model, and $P_1$, $P_2$, $P_3$ and $P_4$ are a first virtual point, a second virtual point, a third virtual point and a fourth virtual point respectively; $[P_{1x} P_{1y} P_{1z}]$ represent coordinates of the first virtual point, $[P_{2x} P_{2y} P_{2z}]$ represent coordinates of the second virtual point, $[P_{3x} P_{3y} P_{3z}]$ represent coordinates of the third virtual point, and $[P_{4x} P_{4y} P_{4z}]$ represent coordinates of the fourth virtual point; and $T_{OT}$ is a translation matrix of a measured point, $R_{OT}$ is a rotation matrix of the measured point, a is a distance between the point $P_1$ and the point $P_2$ on the X-axis of the reflecting head coordinate system, and b is a distance between the point $P_1$ and the point $P_3$ on the Y-axis of the reflecting head coordinate system.

Optionally, the conversion unit is specifically configured for:

tracking and measuring the motion mechanism by the measurement device to obtain a reflecting head track rotating in a B-axis and a reflecting head track rotating in a C-axis;

acquiring a center of circle of the B-axis and a center of circle of the C-axis respectively according to the reflecting head track rotating in the B-axis and the reflecting head track rotating in the C-axis, and performing circle fitting based on the reflecting head track rotating in the B-axis and the center of circle of the B-axis to obtain a radius of the B-axis;

moving the center of circle of the C-axis downward by a numerical value corresponding to the radius of the B-axis to obtain an origin of the motion mechanism;

acquiring a plurality of points on an X-axis and a Y-axis by point measurement, and obtaining straight lines on which the X-axis and the Y-axis are located by straight line fitting; and     establishing a coordinate system based on the origin of the motion mechanism and the straight lines on which the X-axis and the Y-axis are located to obtain the new measurement coordinate system.

Optionally, the calculation unit is specifically configured for:

resetting the motion mechanism, and measuring current rotation matrix and translation matrix of a first virtual point by the measurement device, wherein the first virtual point is an origin of the reflecting head coordinate system;

acquiring the spatial relationship between the reflecting head and the tail end of the motion mechanism according to the current rotation matrix and translation matrix of the first virtual point; and calculating a theoretical value of the dimensionless kinematics model according to the spatial relationship between the reflecting head and the tail end of the motion mechanism.

A third aspect of the present application provides a dimensionless kinematics calibration device based on a virtual point, which comprises a processor and a storage, wherein:

the storage is configured for storing a program code and transmitting the program code to the processor; and the processor is configured for executing the dimensionless kinematics calibration method based on the virtual point according to any one item in the first aspect according to an instruction in the program code.

A fourth aspect of the present application provides a computer-readable storage medium, wherein the computer-readable storage medium is configured for storing a program code, and the program code, when executed by a processor, realizes the dimensionless kinematics calibration method based on the virtual point according to any one item in the first aspect.

It can be seen from the technical solution above that the present application has the following advantages:

The present application provides the dimensionless kinematics calibration method based on the virtual point, which comprises the following steps of: establishing the kinematics model of the motion mechanism, wherein the tail end of the motion mechanism is clamped with the reflecting head; arranging the plurality of virtual points at the tail end of the motion mechanism, and establishing the dimensionless kinematics model and the dimensionless error model based on the virtual points and the kinematics model; converting the measurement coordinate system of the measurement device into the motion mechanism coordinate system according to the spatial relationship between the measurement device and the tail end of the motion mechanism to obtain the new measurement coordinate system; acquiring the rotation matrix and the translation matrix of one virtual point measured by the measurement device in the new measurement coordinate system, and calculating the actual coordinates of all virtual points according to the rotation matrix and the translation matrix of the target virtual point to obtain the measured value of the dimensionless kinematics model; acquiring the spatial relationship between the reflecting head and the tail end of the motion mechanism, and calculating the theoretical value of the dimensionless kinematics model according to the spatial relationship between the reflecting head and the tail end of the motion mechanism; and performing the model optimization on the dimensionless error model according to the measured value and the theoretical value of the dimensionless kinematics model to obtain the dimensionless kinematics calibration result of the motion mechanism.

In the present application, by arranging the theoretical virtual point, the position of the point at the tail end of the motion mechanism can be obtained only by one round of motion and one reflecting head during dimensionless kinematics calibration of the motion mechanism. Because the arranged virtual point is the theoretical point, without extra clamping error, and only one reflecting head needs to be measured in one round of motion, the introduction of an interrupted light continuity error and a secondary clamping error and a tedious process of four rounds of motions in a traditional method are avoided, so that the technical problems of introducing too many clamping errors and interrupted light continuity errors and having a tedious calibration process of the prior art in kinematics calibration are improved.

DESCRIPTION OF THE DRAWINGS

In order to illustrate the technical solution in the embodiments of the present application or the prior art more clearly, the drawings which need to be used in describing the embodiments or the prior art will be briefly introduced hereinafter. Apparently, the drawings described hereinafter are only some embodiments of the present application, those of ordinary skills in the art may obtain other drawings according to these drawings without going through any creative work.

DETAILED DESCRIPTION OF PREFERRED EMBODIMENTS

In order to make those skilled in the art better understand the solution of the present application, the technical solution in the embodiments of the present application is clearly and completely described with reference to the drawings in the embodiments of the present application. Apparently, the described embodiments are merely some but not all of the embodiments of the present application. Based on the embodiments of the present application, all other embodiments obtained by those of ordinary skills in the art without going through any creative work should fall within the scope of protection of the present application.

A traditional calibration model comprises six modeling objects, which are namely three positions and three poses. However, because the positions and the poses have different dimensions, there may be the problem of uneven distribution when the modeling objects are optimized together. However, modeling objects of a dimensionless model are positions of a plurality points at a tail end, and a principle the dimensionless model is that the positions of the points are accurate, which means that three poses at the tail end are also accurate. When there are four points, it has been proved that the model can obtain strong robustness, which more or less will make an experimental flow tedious or make the model unstable. Because the modeling objects are all positions, the problem of dimensional inconsistency in a traditional method is avoided. However, this also leads to the problem of measuring positions of the four points on a same configuration of a motion mechanism. In order to obtain a large-scale and high-accuracy measured value at the tail end, the measurement is mostly performed by a laser tracker. The laser tracker may measure three-degree-of-freedom information or six-degree-of-freedom information according to a type of a reflecting head. Because only position information of the tail end needs to be obtained, a three-degree-of-freedom reflecting head may be mounted at the tail end, and then the laser tracker may measure the position information. If there are four reflecting heads, light needs to be switched back and forth between the reflecting heads for measurement. If there is only one reflecting head, the motion mechanism only needs to make four rounds of motions, and the reflecting head is placed on four fixed positions for measurement under each round of motion. If there is only one reflecting head and the motion mechanism is only expected to make one round of motion, then the reflecting head may be placed on four places in sequence for measurement in each configuration. However, in the first method, an interrupted light continuity error of the laser tracker is introduced. Taking a commonly used laser tracker Leica AT960 as an example, a measurement error of the laser tracker is 15 um+6 um/m, while the interrupted light continuity error is ±10 um, and if a measurement distance is 3 m, the introduced error accounts for ⅖ of an overall error. In the second method, a repeated positioning error of the motion mechanism itself is introduced. For a common industrial robot, an error of the industrial robot is 20 um, and an experiment time is longer in the case of four rounds of motions. In the third method, a secondary clamping error is introduced. In addition, a clamping error between the four points is introduced in all the three methods, and it is also necessary to consider joint optimization of calibration models, leading to a more complicated calibration process. Therefore, it is very important to accurately and effectively obtain the positions of the four points at the tail end under the condition of performing kinematics calibration by the dimensionless model.

In order to improve the above problems, the present application provides a dimensionless kinematics calibration method based on a virtual point, and by arranging a theoretical virtual point, the positions of the four points at the tail end of the motion mechanism can be obtained only by one round of motion and one six-degree-of-freedom reflecting head during dimensionless kinematics calibration of the motion mechanism. Because the arranged virtual point is the theoretical point, without extra clamping error, and only one six-degree-of-freedom reflecting head needs to be measured in one round of motion, the introduction of an interrupted light continuity error and a secondary clamping error and a tedious process of four rounds of motions in a traditional method are avoided.

In the present application, position information of one virtual point at the tail end of the motion mechanism is obtained by one laser tracker and one reflecting head, and then position information of other virtual points at the tail end is obtained by using a theory related to a rigid body motion, thus performing kinematics calibration in cooperation with the dimensionless model. In the present application, a kinematics calibration flow comprises modeling first and then measuring, and the following flow will be described in this order. For easy understanding, with reference to FIG. 1, an embodiment of the present application provides a dimensionless kinematics calibration method based on a virtual point, which comprises the following steps.

Figure 1:
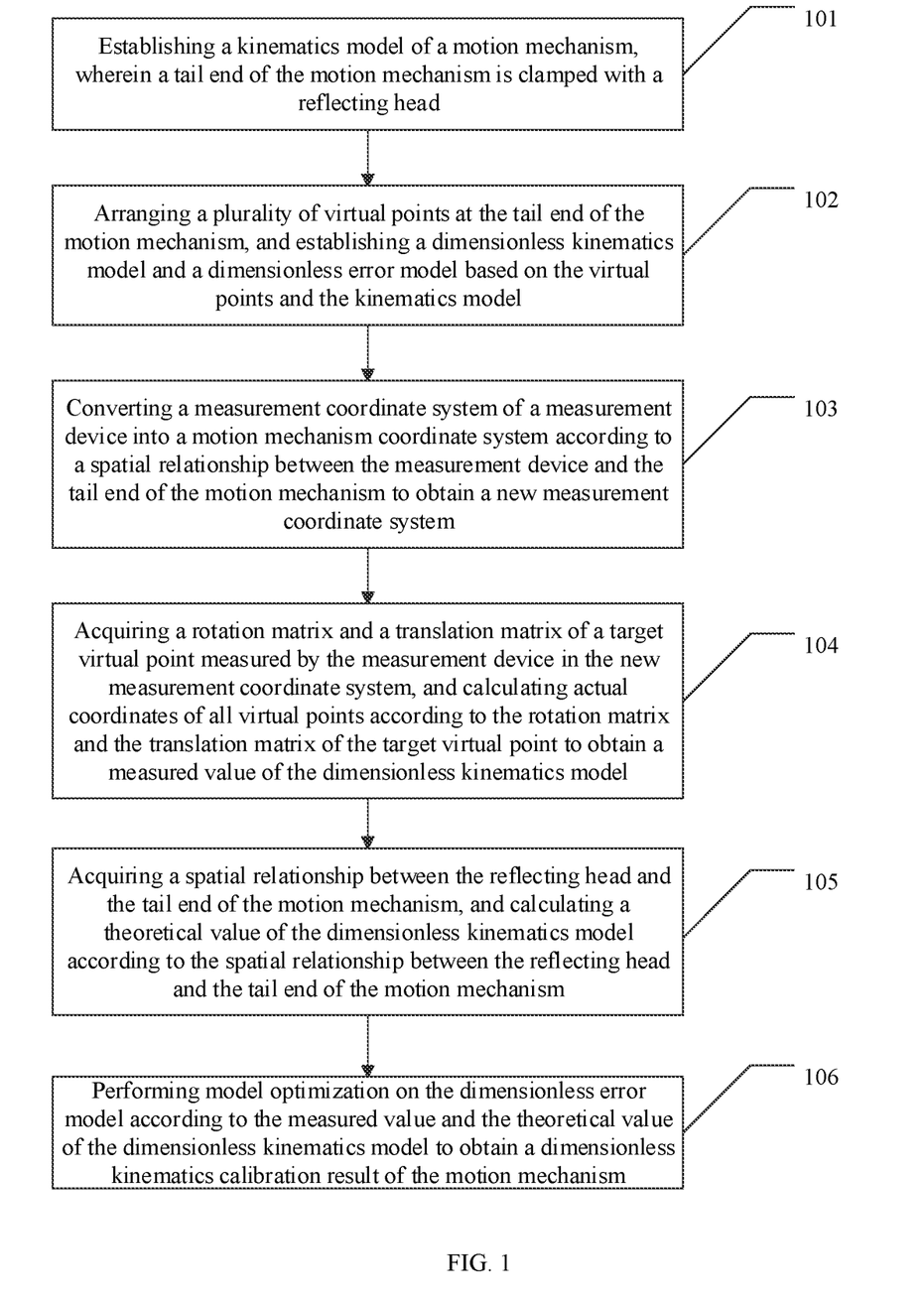
FIG. 1 is a flow chart of a dimensionless kinematics calibration method based on a virtual point provided by an embodiment of the present application.

In step 101, a kinematics model of a motion mechanism is established, wherein a tail end of the motion mechanism is clamped with a reflecting head.

Figure 2:
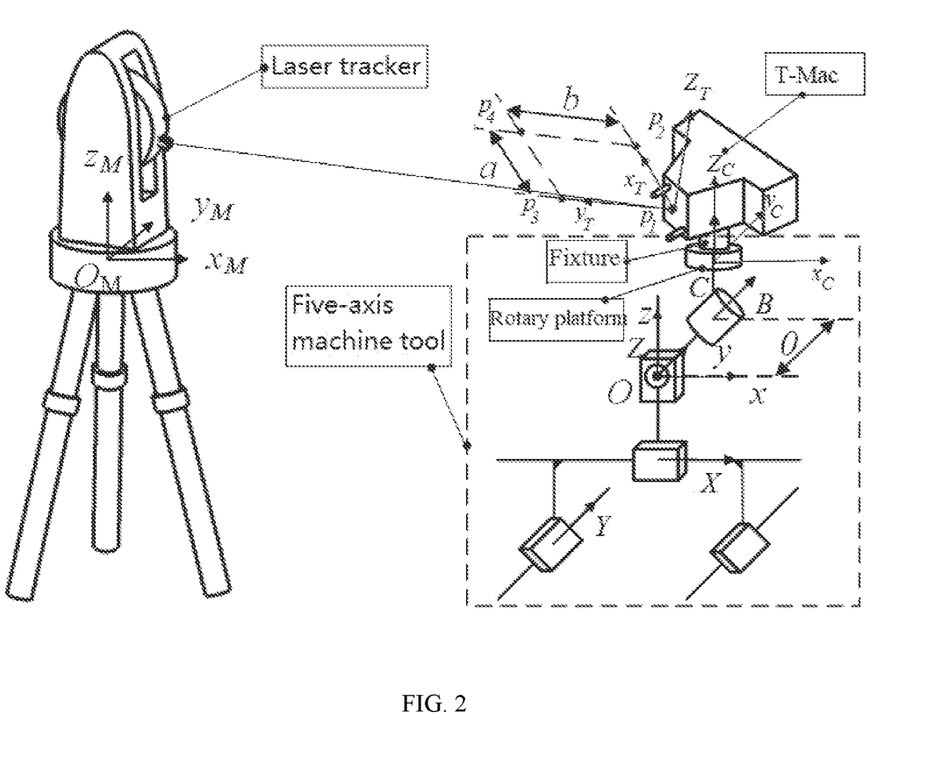
FIG. 2 is a schematic structural diagram of a five-axis machine tool clamped with a reflecting head provided by the embodiment of the present application.

DH (Denavit-Hartenberg), POE (Product of Exponentials Formula), CPC and other methods may be used to establish the kinematics model of the motion mechanism, and this process belongs to the prior art, which will not be repeated herein. In the embodiment of the present application, the tail end of the motion mechanism is clamped with the reflecting head, which is preferably a six-degree-of-freedom reflecting head (T-Mac), and the motion mechanism takes a five-axis machine tool as an example. With reference to FIG. 2, there are respectively a laser tracker, the five-axis machine tool, a rotary platform, a fixture and the T-Mac from left to right. $O_M\text{-}x_M y_M z_M$ is a laser tracker coordinate system, which is static and located in a main machine of the laser tracker, and measured points are all showed in the coordinate system by default. O-xyz is a machine tool coordinate system, which is static and has an origin located at an intersection of a Z-axis and a-B axis in an initial state. $O_C\text{-}x_C y_C z_C$ is a rotary platform coordinate system, which is kinetic and may be changed position and direction with a motion of the machine tool. $O_T\text{-}x_T y_T z_T$ is a reflecting head coordinate system, which is fixed on the T-Mac and may also move with the motion of the machine tool. In addition, because a direction of the T-Mac cannot be guaranteed when the T-Mac is mounted, the reflecting head coordinate system is treated as a coordinate system with no placement rule. $P_1$, $P_2$, $P_3$ and $P_4$ are arranged virtual points, which are all located in a plane of the reflecting head coordinate system, and $P_1$ is an origin of the reflecting head coordinate system. Follow-up coordinate systems are established for various motors of the five-axis machine tool, and $H_{ij} \in i^{4\times 4}$ represents a motion from an i coordinate system to a j coordinate system, so that a result of the kinematics model may be expressed as follows:

$$H_{OT} = H_{OY}H_{YX}H_{XZ}H_{ZB}H_{BC}H_{CT} = \begin{bmatrix} R_{OT} & T_{OT} \\ 0_{1\times 3} & 1 \end{bmatrix};$$

wherein, $H_{OT}$ is a motion matrix from the machine tool coordinate system to the reflecting head coordinate system, $H_{OY}$ is a motion matrix from the machine tool coordinate system to a Y-axis motor coordinate system, $H_{YX}$ is a motion matrix from the Y-axis motor coordinate system to an X-axis motor coordinate system, $H_{XZ}$ is a motion matrix from the X-axis motor coordinate system to a Z-axis motor coordinate system, $H_{ZB}$ is a motion matrix from the Z-axis motor coordinate system to a B-axis motor coordinate system, and $H_{BC}$ is a motion matrix from the B-axis motor coordinate system to a C-axis motor coordinate system, $H_{OY}$, $H_{YX}$, $H_{XZ}$, $H_{ZB}$ and $H_{BC}$ may be obtained by the motion mechanism itself and are known quantities, and $H_{CT}$ is a motion matrix from the C-axis motor coordinate system to the reflecting head coordinate system, which needs to be obtained by subsequent measurement and is an unknown quantity; $T_{OT} \in i^{3\times 1}$ is a translation matrix of the measured points, $R_{OT} \in i^{3\times 3}$ is a rotation matrix of the measured points|, and $0_{1\times 3}$ is a zero matrix with one row and three columns.

In step 102, a plurality of virtual points are arranged at the tail end of the motion mechanism, and a dimensionless kinematics model and a dimensionless error model are established based on the virtual points and the kinematics model.

The dimensionless model comprises the dimensionless kinematics model and the dimensionless error model, the dimensionless kinematics model represents an influence of motor parameters on the tail end, and the dimensionless error model represents an influence of error parameters on the tail end. The four virtual points may be arranged at the tail end of the motion mechanism with reference to FIG. 2, and after the kinematics model is established, according to a use of a homogeneous transformation matrix, motions of the four virtual points $P_1$, $P_2$, $P_3$ and $P_4$ may be expressed as follows:

$$\begin{cases} p_1 = [p_{1x} \ p_{1y} \ p_{1z}]^T = T_{OT} + R_{OT}[0 \ 0 \ 0]^T \\ p_2 = [p_{2x} \ p_{2y} \ p_{2z}]^T = T_{OT} + R_{OT}[a \ 0 \ 0]^T \\ p_3 = [p_{3x} \ p_{3y} \ p_{3z}]^T = T_{OT} + R_{OT}[0 \ b \ 0]^T \\ p_4 = [p_{4x} \ p_{4y} \ p_{4z}]^T = T_{OT} + R_{OT}[a \ b \ 0]^T \end{cases};$$

the dimensionless kinematics model P is:

$$P = [p_1 \ p_2 \ p_3 \ p_4]^T;$$

wherein, $P_1$, $P_2$, $P_3$, and $P_4$ are a first virtual point, a second virtual point, a third virtual point and a fourth virtual point respectively; $[P_{1x} \ P_{1y} \ P_{1z}]$ represent coordinates of the first virtual point, $[P_{2x} \ P_{2y} \ P_{2z}]$ represent coordinates of the second virtual point, $[P_{3x} \ P_{3y} \ P_{3z}]$ represent coordinates of the third virtual point, and $[P_{4x} \ P_{4y} \ P_{4z}]$ represent coordinates of the fourth virtual point; and a is a distance between the point $P_1$ and the point $P_2$ on the X-axis of the reflecting head coordinate system, and b is a distance between the point $P_1$ and the point $P_3$ on the Y-axis of the reflecting head coordinate system. It should be noted that when the kinematics model is established, the parameter $H_{CT}$ is unknown, while $H_{OY}$, $H_{YX}$, $H_{XZ}$, $H_{ZB}$ and $H_{BC}$ are known, so that $T_{OT}$ and $R_{OT}$ are parameters related to $H_{CT}$ which means that a theoretical value of the dimensionless kinematics model P can only be calculated by measuring $H_{CT}$.

When a quantity of poses to be measured is 1, and in is a quantity of error parameters, $E \in i^{12 \times 1}$ is the error of the tail end of the motion mechanism, $J \in i^{12 \times m}$ represents a Jacobian matrix, and $\Delta x \in i^{m \times 1}$ represents the error parameter. When the motion mechanism is the five-axis machine tool, $\Delta x$ specifically represents a structural error and a perpendicularity error of the five-axis machine tool, and the dimensionless error model may be expressed as:

$$E = J\Delta x;$$

E may be measured by a measurement device (such as the laser tracker), $\Delta x$ is a quantity to be optimized, and J is the Jacobian matrix, which may be obtained by the following formula:

$$J = \begin{bmatrix} J_1 \\ J_2 \\ J_3 \\ J_4 \\ \vdots \\ J_{12} \end{bmatrix} = \begin{bmatrix} \frac{\partial p_{1x}}{\partial \Delta x_1} & \frac{\partial p_{1x}}{\partial \Delta x_2} & \cdots & \frac{\partial p_{1x}}{\partial \Delta x_m} \\ \frac{\partial p_{1y}}{\partial \Delta x_1} & \frac{\partial p_{1y}}{\partial \Delta x_2} & \cdots & \frac{\partial p_{1y}}{\partial \Delta x_m} \\ \frac{\partial p_{1z}}{\partial \Delta x_1} & \frac{\partial p_{1z}}{\partial \Delta x_2} & \cdots & \frac{\partial p_{1z}}{\partial \Delta x_m} \\ \frac{\partial p_{2x}}{\partial \Delta x_1} & \frac{\partial p_{2x}}{\partial \Delta x_2} & \cdots & \frac{\partial p_{2x}}{\partial \Delta x_m} \\ \vdots & \vdots & \ddots & \vdots \\ \frac{\partial p_{4z}}{\partial \Delta x_1} & \frac{\partial p_{4z}}{\partial \Delta x_2} & \cdots & \frac{\partial p_{4z}}{\partial \Delta x_m} \end{bmatrix};$$

wherein, is a partial differential symbol. When the quantity of poses to be measured is not 1, it is only necessary to superimpose E and J on a quantity of rows. It should be noted that a scale of $\Delta x$ is always the same.

In step 103, a measurement coordinate system of the measurement device is converted into a motion mechanism coordinate system according to a spatial relationship between the measurement device and the tail end of the motion mechanism to obtain a new measurement coordinate system.

The dimensionless model may be established by the above process, and after the dimensionless model is established, the error E of the tail end of the motion mechanism needs to be solved. The error E of the tail end is obtained by subtracting the theoretical value from an actual value (which is namely a measured value), the theoretical value may be obtained by the dimensionless kinematics model, and the actual value needs to be measured by the measurement device. The measurement may be performed by the laser tracker, and the measured value of the laser tracker is expressed in a built-in measurement coordinate system of the laser tracker by default. Therefore, the measurement coordinate system needs to be converted into the motion mechanism coordinate system first. The laser tracker realizes the measurement by upper computer software (Spatial Analyzer, SA), and the functions of point measurement, tracking measurement, straight line fitting, circle fitting and arrangement of measurement coordinate system of the software need to be used in the following steps.

Firstly, a reflecting head track rotating in a B-axis and a reflecting head track rotating in a C-axis are obtained by tracking and measuring the motion mechanism by the measurement device; and a center of circle of the B-axis and a center of circle of the C-axis are acquired respectively according to the reflecting head track rotating in the B-axis and the reflecting head track rotating in the C-axis, and circle fitting is performed based on the reflecting head track rotating in the B-axis and the center of circle of the B-axis to obtain a radius of the B-axis;

secondly, the center of circle of the C-axis is moved downward by a numerical value corresponding to the radius of the B-axis to obtain an origin of the motion mechanism; and after the center of circle of the C-axis is moved downward by the numerical value corresponding to the radius of the B-axis, a new point is obtained, which is regarded as the origin of the motion mechanism;

subsequently, a plurality of points on an X-axis and a Y-axis are acquired by point measurement, and straight lines on which the X-axis and the Y-axis are located are obtained by straight line fitting; and finally, a coordinate system is established based on the origin of the motion mechanism and the straight lines on which the X-axis and the Y-axis are located to obtain the new measurement coordinate system; and specifically, the new measurement coordinate system may be obtained by setting functions of the measurement coordinate system, selecting the origin of the motion mechanism and fitting the two straight lines obtained, and the new measurement coordinate system is the motion mechanism coordinate system.

In step 104, a rotation matrix and a translation matrix of a target virtual point measured by the measurement device in the new measurement coordinate system are acquired, and actual coordinates of all virtual points are calculated according to the rotation matrix and the translation matrix of the target virtual point to obtain the measured value of the dimensionless kinematics model.

After arranging the measurement coordinate system in the step 103 to obtain the new measurement coordinate system, the rotation matrix and the translation matrix of the measured point measured by the measurement device in the new measurement coordinate system are acquired, which are namely the rotation matrix and the translation matrix of the point $P_1$ (which is namely the target virtual point) shown in FIG. 1, and the actual coordinates of all virtual points may be calculated according to the rotation matrix and the translation matrix of the point $P_1$. However, it should be noted that the translation matrix of the upper computer software SA is in the reflecting head coordinate system relative to the measurement coordinate system, but the rotation matrix is in the measurement coordinate system relative to the reflecting head coordinate system, so that the rotation matrix needs to be transposed to change the relative relationship before being used for calculation. Assuming that the rotation matrix and the translation matrix $T_M$ of the point $P_1$ are measured, and the rotation matrix is transposed to obtain the rotation matrix $R_M$ after a relative position is changed, according to the translation matrix $T_M$ and the transposed rotation matrix $R_M$ of the point $P_1$, measurement coordinates of the four virtual points may be calculated as follows:

$$\begin{cases} p_{1M} = [p_{1Mx} \; p_{1My} \; p_{1Mz}]^T = T_M + R_M[0 \; 0 \; 0]^T \\ p_{2M} = [p_{2Mx} \; p_{2My} \; p_{2Mz}]^T = T_M + R_M[a \; 0 \; 0]^T \\ p_{3M} = [p_{3Mx} \; p_{3My} \; p_{3Mz}]^T = T_M + R_M[0 \; b \; 0]^T \\ p_{4M} = [p_{4Mx} \; p_{4My} \; p_{4Mz}]^T = T_M + R_M[a \; b \; 0]^T \end{cases};$$

$P_{1M}=[P_{1Mx} \; P_{1My} \; P_{1Mz}]^T$ represents measurement coordinates of the first virtual point, $P_{2M}=[P_{2Mx} \; P_{2My} \; P_{2Mz}]^T$ represents measurement coordinates of the second virtual point, $P_{3M}=[P_{3Mx} \; P_{3My} \; P_{3Mz}]^T$ represents measurement coordinates of the third virtual point, and $P_{4M}=[P_{4Mx} \; P_{4My} \; P_{4Mz}]^T$ represents measurement coordinates of the fourth virtual point. The measurement coordinates of the four virtual points may be calculated by the above formulas, which are namely the actual coordinates of the four virtual points, and the measured value of the dimensionless kinematics model may be obtained by substituting the actual coordinates of the four virtual points into the dimensionless kinematics model P.

In step 105, a spatial relationship between the reflecting head and the tail end of the motion mechanism is acquired, and the theoretical value of the dimensionless kinematics model is calculated according to the spatial relationship between the reflecting head and the tail end of the motion mechanism.

After arranging the measurement coordinate system in the step 103 to obtain the new measurement coordinate system, the rotation matrix and the translation matrix of point $P_1$ may be directly measured at the moment. However, it should be noted that the translation matrix of the upper computer software SA is in the reflecting head coordinate system relative to the measurement coordinate system, but the rotation matrix is in the measurement coordinate system relative to the reflecting head coordinate system, so that the rotation matrix needs to be transposed to change the relative relationship before being used for calculation. In order to acquire $H_{CT}$, the motion mechanism needs to be reset, the current rotation matrix and translation matrix of the first virtual point $P_1$ are measured by the measurement device, and then the rotation matrix is transposed to change the relative relationship. When the motion mechanism is the five-axis machine tool, it can be known from the structure of the five-axis machine tool that the current transposed rotation matrix of the first virtual point $P_1$ is the rotation matrix of the $H_{CT}$ and the translation matrix of the $H_{CT}$ can only be obtained by subtracting $|OO_C|$ in returning to zero from the current transposed rotation matrix of the first virtual point $P_1$ in a Z-axis direction. The $|OO_C|$ is a distance between a point O (an origin of the machine tool coordinate system) and a point $O_C$ (an origin of the C-axis motor coordinate system), which is a known structure parameter.

The $H_{CT}$ consists of three translation parameters and three rotation parameters, which is namely an xyz translation matrix multiplied by an xyz Euler angle. That is, after acquiring the rotation matrix and the translation matrix of the $H_{CT}$ the rotation matrix of the $H_{CT}$ is converted into three parameters of the xyz Euler angle, and then the $H_{CT}$ may be calculated in combination with the translation matrix, so that the spatial relationship between the reflecting head and the tail end of the motion mechanism is acquired. After the $H_{CT}$ is calculated, parameters $T_{OT}$ and $R_{OT}$ may be determined, motion representations of the four virtual points $P_1$, $P_2$, $P_3$ and $P_4$ in the step 102 are substituted to obtain theoretical coordinates of the four virtual points, and the theoretical coordinates of the four virtual points are substituted into the dimensionless kinematics model P to obtain the theoretical value of the dimensionless kinematics model.

In step 106, model optimization is performed on the dimensionless error model according to the measured value and the theoretical value of the dimensionless kinematics model to obtain a dimensionless kinematics calibration result of the motion mechanism.

After acquiring the measured value and the theoretical value of the dimensionless kinematics model, necessary information of the dimensionless error model $E=J\Delta x$ is established, then the dimensionless error model may be optimized by Gauss Newton, an LM (Levenberg-Marquard) algorithm, a trust region algorithm and the like, and the error of the tail end becomes smaller and smaller by constantly modifying a numerical value of $\Delta x$ until the error of the tail end is converged. Because these optimization algorithms belong to the prior art, a detailed optimization process will not be repeated herein. According to the embodiment of the present application, the theoretical virtual point is arranged at the tail end of the motion mechanism to establish the dimensionless kinematics model and the dimensionless error model, which can avoid the problem of dimensional inconsistency in the traditional method when the model is optimized, so that the optimization is more realistic. Spatial coordinates of the arranged virtual point are obtained through a translation matrix and a rotation matrix of one actually measured point for optimizing the dimensionless model, which avoids a clamping error introduced during mounting of other feedback apparatuses.

Figure 3:
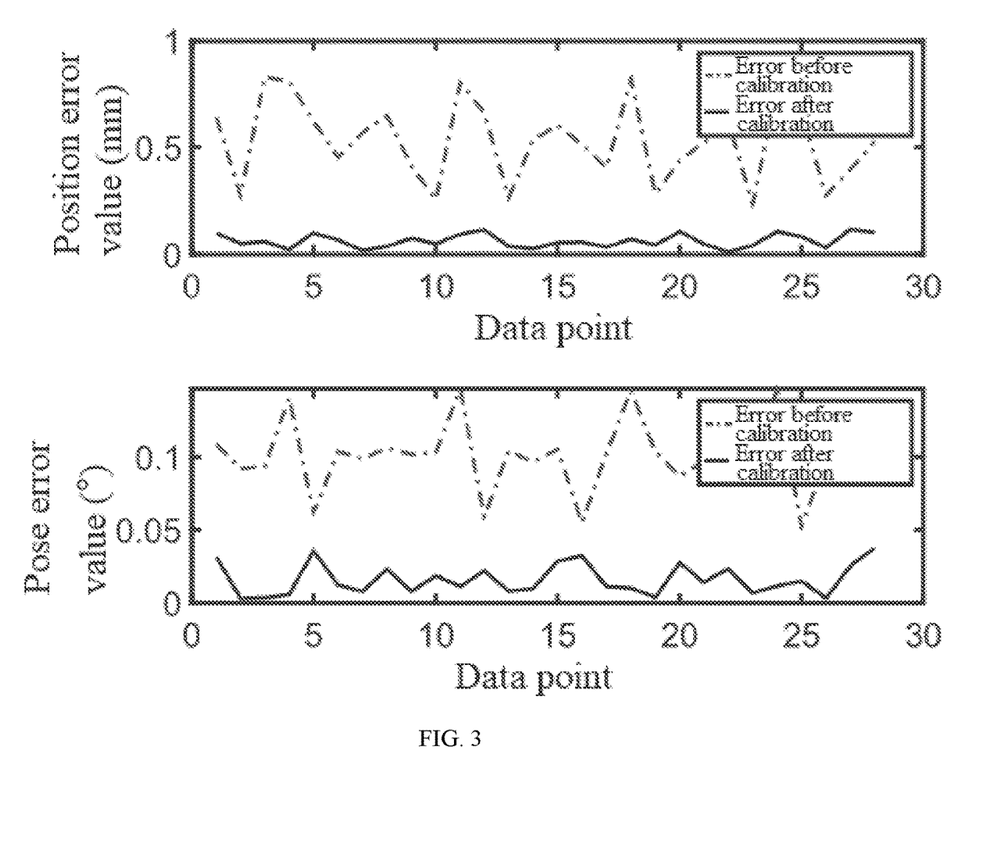
FIG. 3 is a schematic diagram of a dimensionless kinematics calibration effect based on a virtual point provided by the embodiment of the present application.

The dimensionless kinematics calibration of the motion mechanism is realized by the calibration method in the embodiment of the present application. Taking a five-axis serial kinematics platform as an example, dimensionless kinematics calibration results are shown in FIG. 3, wherein a position error is expressed by a spatial error, which is namely a Euclidean distance; and a pose error is expressed by an angle error between a theoretical rotation axis and an actual rotation axis, and the rotation axis is obtained by mapping from Lie group to Lie algebra. It can be seen from FIG. 3 that, the position error and the pose error are both obviously reduced after the calibration method in the embodiment of the present application.

Compared with the prior art, the advantages of the present application lie in that:
1. according to the method of the present application, by introducing the virtual points, positions of a plurality of points are set as objects of the kinematics model and the error model, instead of a position and a pose of one point in the traditional method, so that a modeling process is faster, and meanwhile, dimension consistency during optimization of the model is ensured, thus avoiding a bias of the traditional method during optimization;
2. according to the method of the present application, only one six-degree-of-freedom feedback apparatus needs to be measured, instead of multiple three-degree-of-freedom feedback apparatuses to be measured in the traditional method, thus avoiding the problem of accuracy loss introduced into the measurement device during switching between the feedback apparatuses;

3. according to the method of the present application, the measurement may be completed only by enabling the motion mechanism to make one round of motion, and if the motion mechanism makes multiple rounds of motions in cooperation with the three-degree-of-freedom feedback apparatuses for measurement, a repeated positioning error of the mechanism itself may be introduced, so that an experimental flow is more complicated; and 4. according to the method of the present application, the arranged virtual points are the theoretical points, instead of the actual points in the traditional method, so that it is unnecessary to consider the clamping error between multiple points, thus simplifying the calibration model and the calibration process.

The above is one embodiment of the dimensionless kinematics calibration method based on the virtual point provided by the present application, and the following is one embodiment of a dimensionless kinematics calibration apparatus based on a virtual point.

Figure 4:
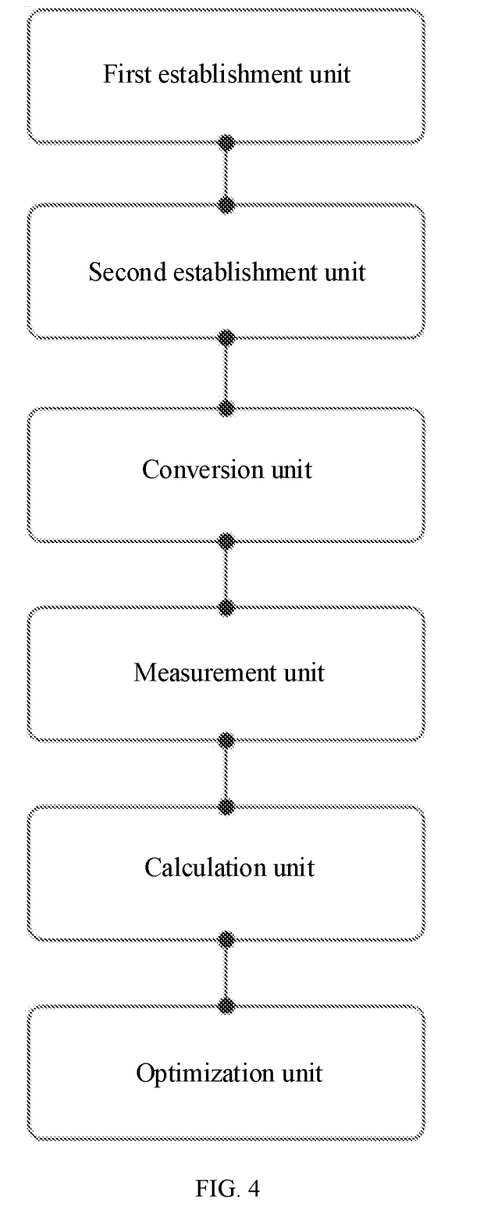
FIG. 4 is a schematic structural diagram of a dimensionless kinematics calibration apparatus based on a virtual point provided by the embodiment of the present application.

With reference to FIG. 4, the embodiment of the present application provides the dimensionless kinematics calibration apparatus based on the virtual point, which comprises:

a first establishment unit for establishing a kinematics model of a motion mechanism, wherein a tail end of the motion mechanism is clamped with a reflecting head;

a second establishment unit for arranging a plurality of virtual points at the tail end of the motion mechanism, and establishing a dimensionless kinematics model and a dimensionless error model based on the virtual points and the kinematics model;

a conversion unit for converting a measurement coordinate system of a measurement device into a motion mechanism coordinate system according to a spatial relationship between the measurement device and the tail end of the motion mechanism to obtain a new measurement coordinate system;

a measurement unit for acquiring a rotation matrix and a translation matrix of a target virtual point measured by the measurement device in the new measurement coordinate system, and calculating actual coordinates of all virtual points according to the rotation matrix and the translation matrix of the target virtual point to obtain a measured value of the dimensionless kinematics model, wherein the target virtual point is an origin of a reflecting head coordinate system;

a calculation unit for acquiring a spatial relationship between the reflecting head and the tail end of the motion mechanism, and calculating a theoretical value of the dimensionless kinematics model according to the spatial relationship between the reflecting head and the tail end of the motion mechanism; and an optimization unit for performing model optimization on the dimensionless error model according to the measured value and the theoretical value of the dimensionless kinematics model to obtain a dimensionless kinematics calibration result of the motion mechanism.

As a further improvement, the dimensionless kinematics model is:

$$P = [p_1 \ p_2 \ p_3 \ p_4]^T;$$

$$\begin{cases} p_1 = [p_{1x} \ p_{1y} \ p_{1z}]^T = T_{OT} + R_{OT}[0 \ 0 \ 0]^T \\ p_2 = [p_{2x} \ p_{2y} \ p_{2z}]^T = T_{OT} + R_{OT}[a \ 0 \ 0]^T \\ p_3 = [p_{3x} \ p_{3y} \ p_{3z}]^T = T_{OT} + R_{OT}[0 \ b \ 0]^T \\ p_4 = [p_{4x} \ p_{4y} \ p_{4z}]^T = T_{OT} + R_{OT}[a \ b \ 0]^T \end{cases};$$

wherein, P represents the dimensionless kinematics model, and $P_1$, $P_2$, $P_3$, and $P_4$ are a first virtual point, a second virtual point, a third virtual point and a fourth virtual point respectively; $[P_{1x}P_{1y}P_{1z}]$ represent coordinates of the first virtual point, $[P_{2x}P_{2y}P_{2z}]$ represent coordinates of the second virtual point, $[P_{3x}P_{3y}P_{3z}]$ represent coordinates of the third virtual point, and $[P_{4x}P_{4y}P_{4z}]$ represent coordinates of the fourth virtual point; and $T_{OT}$ is a translation matrix of a measured point, $R_{OT}$ is a rotation matrix of the measured point, a is a distance between the point $P_1$ and the point $P_2$ on the X-axis of the reflecting head coordinate system, and b is a distance between the point $P_1$ and the point $P_3$ on the Y-axis of the reflecting head coordinate system.

As a further improvement, the conversion unit is specifically configured for:

tracking and measuring the motion mechanism by the measurement device to obtain a reflecting head track rotating in a B-axis and a reflecting head track rotating in a C-axis;

acquiring a center of circle of the B-axis and a center of circle of the C-axis respectively according to the reflecting head track rotating in the B-axis and the reflecting head track rotating in the C-axis, and performing circle fitting based on the reflecting head track rotating in the B-axis and the center of circle of the B-axis to obtain a radius of the B-axis;

moving the center of circle of the C-axis downward by a numerical value corresponding to the radius of the B-axis to obtain an origin of the motion mechanism;

acquiring a plurality of points on an X-axis and a Y-axis by point measurement, and obtaining straight lines on which the X-axis and the Y-axis are located by straight line fitting; and establishing a coordinate system based on the origin of the motion mechanism and the straight lines on which the X-axis and the Y-axis are located to obtain the new measurement coordinate system.

As a further improvement, the calculation unit is specifically configured for:

resetting the motion mechanism, and measuring current rotation matrix and translation matrix of a first virtual point by the measurement device, wherein the first virtual point is an origin of the reflecting head coordinate system;

acquiring the spatial relationship between the reflecting head and the tail end of the motion mechanism according to the current rotation matrix and translation matrix of the first virtual point; and calculating a theoretical value of the dimensionless kinematics model according to the spatial relationship between the reflecting head and the tail end of the motion mechanism.

In the embodiment of the present application, by arranging the theoretical virtual point, the position of the point at the tail end of the motion mechanism can be obtained only by one round of motion and one reflecting head during dimensionless kinematics calibration of the motion mechanism. Because the arranged virtual point is the theoretical point, without extra clamping error, and only one reflecting head needs to be measured in one round of motion, the introduction of an interrupted light continuity error and a secondary clamping error and a tedious process of four rounds of motions in a traditional method are avoided, so that the technical problems of introducing too many clamping errors and interrupted light continuity errors and having a tedious calibration process of the prior art in kinematics calibration are improved.

The embodiment of the present application further provides a dimensionless kinematics calibration device based on a virtual point, which comprises a processor and a storage.

The storage is configured for storing a program code and transmitting the program code to the processor.

The processor is configured for executing the dimensionless kinematics calibration method based on the virtual point in the method embodiment above according to an instruction in the program code.

The embodiment of the present application further provides a computer-readable storage medium, wherein the computer-readable storage medium is used for storing a program code, and the program code, when executed by a processor, realizes the dimensionless kinematics calibration method based on the virtual point in the method embodiment above.

It can be clearly understood by those skilled in the art that, for the sake of convenience and brevity in description, a detailed working process of the foregoing apparatus and unit may refer to a corresponding process in the foregoing method embodiments, and will not be elaborated herein.

The terms "first", "second", "third", "fourth", and the like (if any) in the specification and the drawings of the present application above are used to distinguish similar objects, and are not necessarily used to describe a specific order or sequence. It should be understood that data used in this way may be interchanged under appropriate circumstances, so that the embodiments of the present application described herein can be implemented in a sequence other than those illustrated or described herein. In addition, the terms "comprising", "having" and any variations thereof are intended to cover non-exclusive inclusion. For example, a process, method, system, product or device comprising a series of steps or units is not necessarily limited to those steps or units clearly listed, but may comprise other steps or units not clearly listed in or inherent to the process, method, product or device.

It should be understood that, in the present application, "at least one (item)" refers to being one or more, and "multiple" refers to being two or more. 'And/or' is used for describing the relationship between related objects, and indicates that there may be three relationships. For example, "A and/or B" may indicate that: A exists alone, B exists alone, and A and B exist at the same time, wherein A and B may be singular or plural. The symbol "/" generally indicates that there is a relationship of "or" between the related objects. 'At least one (item) of the followings' or similar expression thereof refers to any combination of these items, comprising a singular (item) or any combination of plural (items). For example, at least one (item) of a, b or c may indicate: a, b, c, "a and b", "a and c", "b and c", or "a and b and c", wherein a, b and c may be singular or plural.

In the several embodiments provided in the present application, it should be understood that the disclosed apparatus and method may be implemented in other ways. For example, the apparatus embodiments described above are only illustrative. For example, the division of the units is only one logical function division. In practice, there may be other division methods. For example, multiple units or components may be combined or integrated into another system, or some features may be ignored or not executed. In addition, the illustrated or discussed mutual coupling or direct coupling or communication connection may be indirect coupling or communication connection through some interfaces, apparatuses or units, and may be in electrical, mechanical or other forms.

The units illustrated as separated parts may be or not be physically separated, and the parts displayed as units may be or not be physical units, which means that the parts may be located in one place or distributed on multiple network units. Some or all of the units may be selected according to actual needs to achieve the objects of the solutions of the embodiments.

In addition, each functional unit in each embodiment of the present application may be integrated in one processing unit, or each unit may exist alone physically, or two or more units may be integrated in one unit. The integrated units above may be implemented in a form of hardware, or may be implemented in a form of software functional unit.

The integrated units, if being implemented in the form of software functional unit and taken as an independent product to sell or use, may also be stored in one computer-readable storage medium. Based on such understanding, the essence of the technical solution of the present application, or a part contributing to the prior art, or all or a part of the technical solution may be embodied in a form of software product. The computer software product is stored in one storage medium including a number of instructions such that a computer device (which may be a personal computer, a server, or a network device, etc.) executes all or a part of steps of the method in the embodiments of the present application. Moreover, the foregoing storage medium comprises: various media capable of storing the program code, such as a USB disk, a mobile hard disk, a Read-Only Memory (ROM), a Random Access Memory (RAM), a magnetic disk or an optical disk.

As described above, the embodiments above are only used to illustrate the technical solution of the present application, and are not intended to limit the present application. Although the present application has been described in detail with reference to the above-mentioned embodiments, those of ordinary skills in the art should understand that: the technical solution recorded in the above-mentioned embodiments can still be modified, or equivalent substitutions can be made to a part of the technical features in the embodiments. However, these modifications or substitutions should not depart from the spirit and scope of the technical solution of the embodiments of the present application.

We claim:

1. A dimensionless kinematics calibration method based on a virtual point, comprising the following steps of:
   establishing a kinematics model of a motion mechanism, wherein a tail end of the motion mechanism is clamped with a reflecting head;
   arranging a plurality of virtual points at the tail end of the motion mechanism, and establishing a dimensionless kinematics model and a dimensionless error model based on the virtual points and the kinematics model;
   converting a measurement coordinate system of a measurement device into a motion mechanism coordinate system according to a spatial relationship between the measurement device and the tail end of the motion mechanism to obtain a new measurement coordinate system;

acquiring a rotation matrix and a translation matrix of a target virtual point measured by the measurement device in the new measurement coordinate system, and calculating actual coordinates of all virtual points according to the rotation matrix and the translation matrix of the target virtual point to obtain a measured value of the dimensionless kinematics model, wherein the target virtual point is an origin of a reflecting head coordinate system;

acquiring a spatial relationship between the reflecting head and the tail end of the motion mechanism, and calculating a theoretical value of the dimensionless kinematics model according to the spatial relationship between the reflecting head and the tail end of the motion mechanism; and performing model optimization on the dimensionless error model according to the measured value and the theoretical value of the dimensionless kinematics model to obtain a dimensionless kinematics calibration result of the motion mechanism;

wherein, the converting the measurement coordinate system of the measurement device into the motion mechanism coordinate system according to the spatial relationship between the measurement device and the tail end of the motion mechanism to obtain the new measurement coordinate system, comprises the following steps of:

tracking and measuring the motion mechanism by the measurement device to obtain a reflecting head track rotating in a B-axis and a reflecting head track rotating in a C-axis;

acquiring a center of circle of the B-axis and a center of circle of the C-axis respectively according to the reflecting head track rotating in the B-axis and the reflecting head track rotating in the C-axis, and performing circle fitting based on the reflecting head track rotating in the B-axis and the center of circle of the B-axis to obtain a radius of the B-axis;

moving the center of circle of the C-axis downward by a numerical value corresponding to the radius of the B-axis to obtain an origin of the motion mechanism;

acquiring a plurality of points on an X-axis and a Y-axis by point measurement, and obtaining straight lines on which the X-axis and the Y-axis are located by straight line fitting; and establishing a coordinate system based on the origin of the motion mechanism and the straight lines on which the X-axis and the Y-axis are located to obtain the new measurement coordinate system;

the acquiring the spatial relationship between the reflecting head and the tail end of the motion mechanism, comprises the following steps of:

resetting the motion mechanism, and measuring current rotation matrix and translation matrix of a first virtual point by the measurement device, wherein the first virtual point is an origin of the reflecting head coordinate system; and acquiring the spatial relationship between the reflecting head and the tail end of the motion mechanism according to the current rotation matrix and translation matrix of the first virtual point.

2. The dimensionless kinematics calibration method based on the virtual point according to claim 1, wherein the dimensionless kinematics model is:

$$P = [p_1 \ p_2 \ p_3 \ p_4]^T;$$

$$\begin{cases} p_1 = [p_{1x} \ p_{1y} \ p_{1z}]^T = T_{OT} + R_{OT}[0 \ 0 \ 0]^T \\ p_2 = [p_{2x} \ p_{2y} \ p_{2z}]^T = T_{OT} + R_{OT}[a \ 0 \ 0]^T \\ p_3 = [p_{3x} \ p_{3y} \ p_{3z}]^T = T_{OT} + R_{OT}[0 \ b \ 0]^T \\ p_4 = [p_{4x} \ p_{4y} \ p_{4z}]^T = T_{OT} + R_{OT}[a \ b \ 0]^T \end{cases};$$

wherein, P represents the dimensionless kinematics model, and $P_1$, $P_2$, $P_3$ and $P_4$ are a first virtual point, a second virtual point, a third virtual point and a fourth virtual point respectively; $[P_{1x} \ P_{1y} \ P_{1z}]$ represent coordinates of the first virtual point, $[P_{2x} \ P_{2y} \ P_{2z}]$ represent coordinates of the second virtual point, $[P_{3x} \ P_{3y} \ P_{3z}]$ represent coordinates of the third virtual point, and $[P_{4x} \ P_{4y} \ P_{4z}]$ represent coordinates of the fourth virtual point; and $T_{OT}$ is a translation matrix of a measured point, $R_{OT}$ is a rotation matrix of the measured point, a is a distance between the point $P_1$ and the point $P_2$ on the X-axis of the reflecting head coordinate system, and b is a distance between the point $P_1$ and the point $P_3$ on the Y-axis of the reflecting head coordinate system.

3. A dimensionless kinematics calibration device based on a virtual point, comprising a processor and a storage, wherein:

the storage is configured for storing a program code and transmitting the program code to the processor; and the processor is configured for executing the dimensionless kinematics calibration method based on the virtual point according to claim 1 according to an instruction in the program code.

4. A dimensionless kinematics calibration apparatus based on a virtual point, comprising:

a first establishment unit for establishing a kinematics model of a motion mechanism, wherein a tail end of the motion mechanism is clamped with a reflecting head;

a second establishment unit for arranging a plurality of virtual points at the tail end of the motion mechanism, and establishing a dimensionless kinematics model and a dimensionless error model based on the virtual points and the kinematics model;

a conversion unit for converting a measurement coordinate system of a measurement device into a motion mechanism coordinate system according to a spatial relationship between the measurement device and the tail end of the motion mechanism to obtain a new measurement coordinate system;

a measurement unit for acquiring a rotation matrix and a translation matrix of a target virtual point measured by the measurement device in the new measurement coordinate system, and calculating actual coordinates of all virtual points according to the rotation matrix and the translation matrix of the target virtual point to obtain a measured value of the dimensionless kinematics model, wherein the target virtual point is an origin of a reflecting head coordinate system;

a calculation unit for acquiring a spatial relationship between the reflecting head and the tail end of the motion mechanism, and calculating a theoretical value of the dimensionless kinematics model according to the spatial relationship between the reflecting head and the tail end of the motion mechanism; and an optimization unit for performing model optimization on the dimensionless error model according to the measured value and the theoretical value of the dimensionless kinematics model to obtain a dimensionless kinematics calibration result of the motion mechanism;

wherein, the conversion unit is specifically configured for:

tracking and measuring the motion mechanism by the measurement device to obtain a reflecting head track rotating in a B-axis and a reflecting head track rotating in a C-axis;

acquiring a center of circle of the B-axis and a center of circle of the C-axis respectively according to the reflecting head track rotating in the B-axis and the reflecting head track rotating in the C-axis, and performing circle fitting based on the reflecting head track rotating in the B-axis and the center of circle of the B-axis to obtain a radius of the B-axis;

moving the center of circle of the C-axis downward by a numerical value corresponding to the radius of the B-axis to obtain an origin of the motion mechanism;

acquiring a plurality of points on an X-axis and a Y-axis by point measurement, and obtaining straight lines on which the X-axis and the Y-axis are located by straight line fitting; and establishing a coordinate system based on the origin of the motion mechanism and the straight lines on which the X-axis and the Y-axis are located to obtain the new measurement coordinate system;

the calculation unit is specifically configured for:

resetting the motion mechanism, and measuring current rotation matrix and translation matrix of a first virtual point by the measurement device, wherein the first virtual point is an origin of the reflecting head coordinate system;

acquiring the spatial relationship between the reflecting head and the tail end of the motion mechanism according to the current rotation matrix and translation matrix of the first virtual point; and calculating a theoretical value of the dimensionless kinematics model according to the spatial relationship between the reflecting head and the tail end of the motion mechanism.

5. The dimensionless kinematics calibration apparatus based on the virtual point according to claim 4, wherein the dimensionless kinematics model is:

$$P = [\,p_1 \quad p_2 \quad p_3 \quad p_4\,]^T;$$

$$\begin{cases} p_1 = [\,p_{1x} \quad p_{1y} \quad p_{1z}\,]^T = T_{OT} + R_{OT}[\,0 \quad 0 \quad 0\,]^T \\ p_2 = [\,p_{2x} \quad p_{2y} \quad p_{2z}\,]^T = T_{OT} + R_{OT}[\,a \quad 0 \quad 0\,]^T \\ p_3 = [\,p_{3x} \quad p_{3y} \quad p_{3z}\,]^T = T_{OT} + R_{OT}[\,0 \quad b \quad 0\,]^T \\ p_4 = [\,p_{4x} \quad p_{4y} \quad p_{4z}\,]^T = T_{OT} + R_{OT}[\,a \quad b \quad 0\,]^T \end{cases};$$

wherein, P represents the dimensionless kinematics model, and $P_1$, $P_2$, $P_3$ and $P_4$ are a first virtual point, a second virtual point, a third virtual point and a fourth virtual point respectively; $[P_{1x}\ P_{1y}\ P_{1z}]$ represent coordinates of the first virtual point, $[P_{2x}\ P_{2y}\ P_{1z}]$ represent coordinates of the second virtual point, $[P_{3x}\ P_{3y}\ P_{3z}]$ represent coordinates of the third virtual point, and $[P_{4x}\ P_{4y}\ P_{4z}]$ represent coordinates of the fourth virtual point; and $T_{OT}$ is a translation matrix of a measured point, $R_{OT}$ is a rotation matrix of the measured point, a is a distance between the point $P_1$ and the point $P_2$ on the X-axis of the reflecting head coordinate system, and b is a distance between the point $P_1$ and the point $P_3$ on the Y-axis of the reflecting head coordinate system.

\* \* \* \* \*